Patented Feb. 6, 1923.

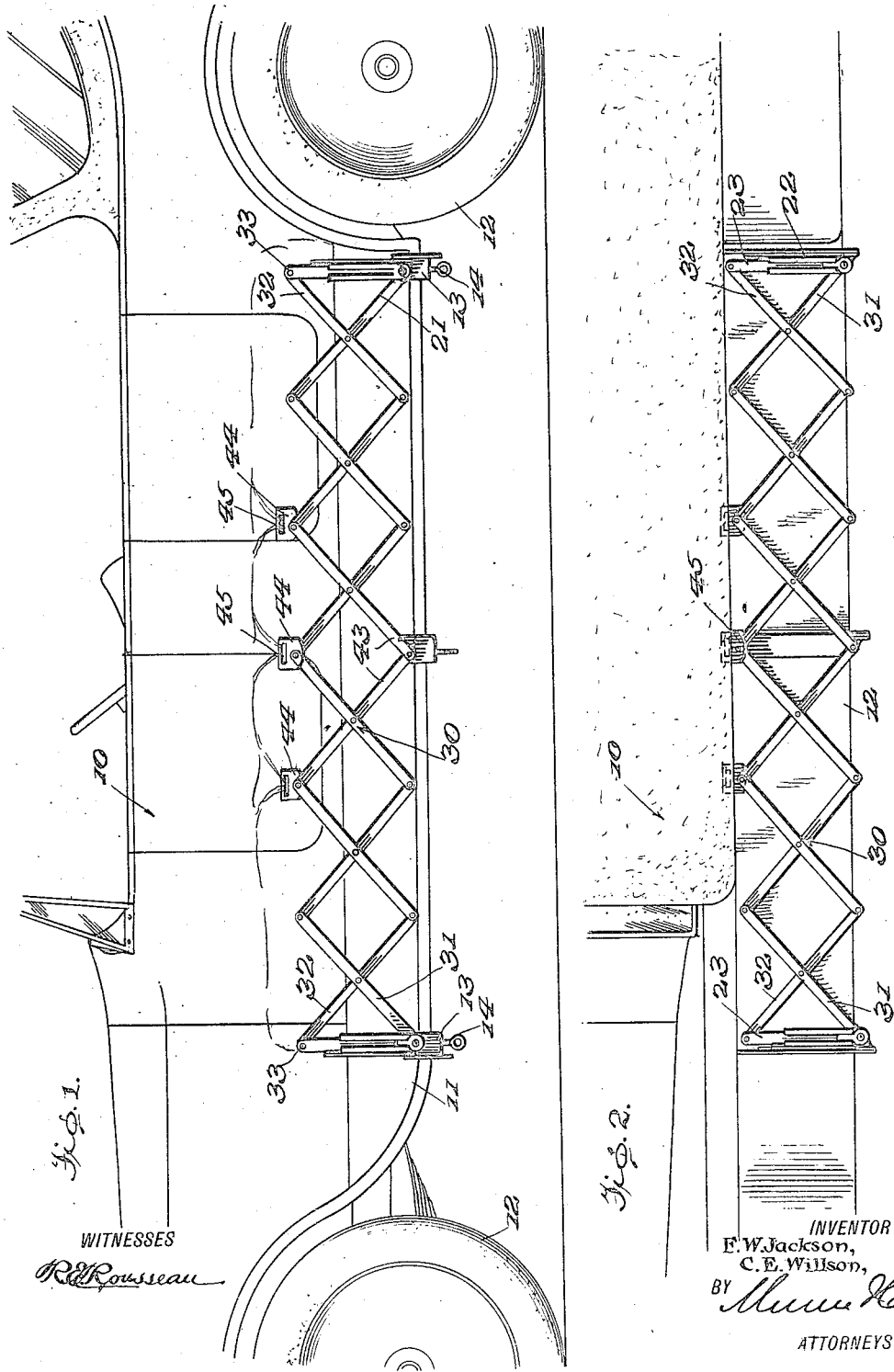

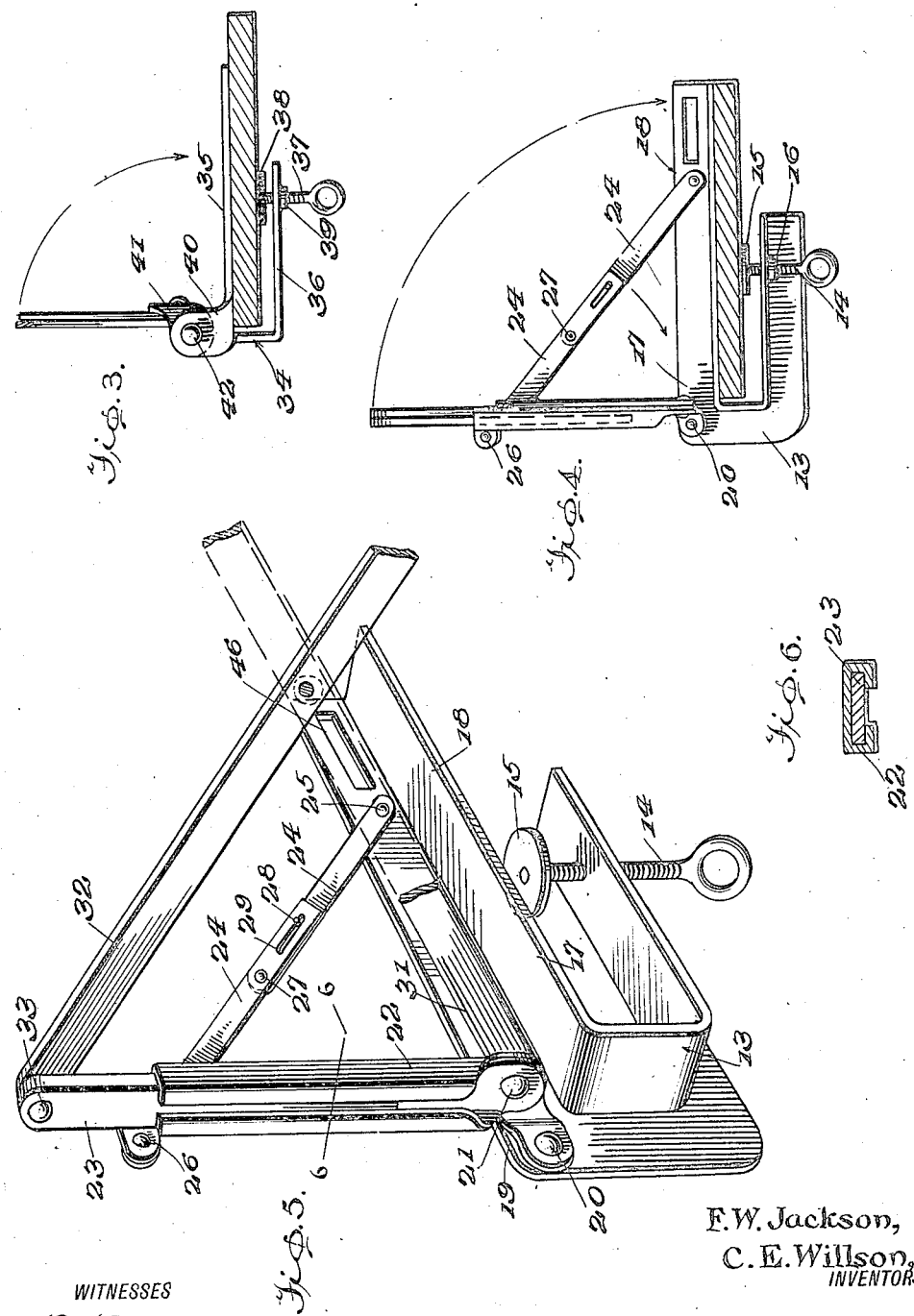

1,444,507

UNITED STATES PATENT OFFICE.

FREDERIC WALTER JACKSON AND CHARLES EDWARD WILLSON, OF REGINA, SASKATCHEWAN, CANADA.

LUGGAGE-CARRIER ATTACHMENT FOR AUTOMOBILES.

Application filed September 14, 1921. Serial No. 500,589.

*To all whom it may concern:*

Be it known that we, FREDERIC W. JACKSON and CHARLES E. WILLSON, citizens of Canada, and residents of Regina, in the Province of Saskatchewan, Canada, have invented certain new and useful Improvements in Luggage-Carrier Attachments for Automobiles, of which the following is a specification.

This invention relates to a luggage carrier attachment for automobiles.

The object of the invention is to provide an attachment of the above character which may be easily attached to the running board of an automobile and adapted to be folded upon the running board when not in use so that the same may not interfere with the opening and closing of the doors of the automobile body with which it is associated.

It is also an important object of the invention that the carrier be easily removable from the running board with which it may be associated and adapted to be folded into a compact unit for storage or shipment.

A further object of the invention is that the carrier be adapted to prevent any accidental loss of luggage held thereby.

Other objects will hereinafter appear.

The invention is illustrated by way of example in the accompanying drawings, in which:—

Figure 1 is a side elevation of an automobile showing the invention applied and when distended or raised for the reception of luggage.

Figure 2 is a partial top plan view of the carrier when folded upon the running board.

Figure 3 is a vertical sectional view taken at a point intermediate the ends of the running board and illustrating the central supporting means for the carrier when said carrier is unfolded or raised.

Figure 4 is a view similar to Figure 3, but taken adjacent one end of the running board and illustrating an end supporting means for the carrier.

Figure 5 is an enlarged detail perspective view further illustrating the manner in which the ends of the carrier are supported.

Figure 6 is a sectional view taken substantially on the lines 6—6 of Figure 5.

Referring to the drawings more particularly, 10 indicates generally an automobile body which is equipped with the running board 11, one on each side thereof and supported by the wheels 12. In carrying out the invention a pair of clamps 13 are provided which are substantially U-shaped and preferably formed of angle iron as best shown in Figure 5. The horizontal portion of the angle irons of which the clamps are formed serve as the clamp faces. Each clamp 13 is adapted to be slid upon a running board and so held by an eye-bolt 14, said eye-bolt in each instance carrying a circular plate 15 adapted to engage the lower face of the running board as illustrated in Figures 3 and 4. Each eye-bolt 14 is also provided with a nut 16 by which the same may be locked in its position for clamping the members 13 to the running board.

The upper leg 17 of each clamp member 13 is extended as at 18 so that the same is substantially equal in length to the width of the running board. To each clamp there is pivoted a substantially L-shaped hinged member 19 by the means of a rivet as at 20, said L-shaped members in each instance being connected to the bridge portion of the clamp members at a point adjacent the upper end of the vertical portion of the angle irons forming the clamp as best shown in Figures 4 and 5. To the free portion of each L-shaped member 19 there is pivotally connected by the means of a rivet 21 a split sleeve 22. Within the sleeve 22 there is slidably positioned a bar 23 and between the upper leg 18 of each clamp member 13 and the associated sleeve 22 there is extended a pair of links 24. The lowermost link is pivoted to the clamp member by a rivet as at 25, while the upper link has its upper end pivotally connected to the sleeve 22 as at 26. The links have their adjacent ends pivoted to each other as at 27 and overlap each other as shown in Figures 4 and 5. The upper link has its portion overlapping the other formed with a stud as indicated at 28, which is adapted to engage in a recess indicated at 29 in the same position of the other link when said links are brought into longitudinal alignment, and in this manner locking the links against folding movement upon their pivot 27. By the means of the hinged member 19 the sleeve 22 may be folded upon its associated clamp member 13, that is, provided the links 24 are simultaneously folded.

In further constructing my novel baggage carrier I provide a lazy tong construction generally indicated by the reference numeral 30. The free end of the end link 31 is pivoted to the lower end of the associated sleeve 22, the rivet 21 being preferably used for this purpose, while the free end of each of the links 32 are pivotally connected to the bars 23 as at 33. At a point intermediate the pair of clamps 13 there is provided an additional clamp 34 which is U-shaped and its leg 35 of greater length than its leg 36. The clamp is also provided with an eye-screw 37 carrying a circular plate 38 at its inner end adapted to engage the lower section of the running board and securing the same thereto; also the eye-bolt carries a lock nut 39 by which the same may be held in adjusted position. The clamp 34 is made from an ordinary bar of iron, and its leg 35 adjacent its bridge portion is formed with an upwardly extending ear 40 to which there is hinged an L-shaped member 41 by the means of a rivet as at 42. To the free end of the L-shaped member 41 there is pivotally connected at the meeting ends a pair of tongs 43, said tongs occurring at a point intermediate the ends of the lazy tong structure. The L-shaped hinge 41 is also adapted to be folded or turned inwardly upon the upper leg 35 of the clamp member 34.

The lazy tong structure has also secured thereto a plurality of lugs 44 as shown in Figures 1 and 2, each of which is provided with a slot 45, said slots being adapted to permit the passage of a strap for securing the luggage in position; also each clamp 13 is provided with a slot as at 46 which may be also utilized for securing luggage within the carrier by the means of straps or the like.

When it is desired to use the present device, it is only necessary to distend the lazy tong structure 30 and then secure the clamp members 13 to the running board by the manipulation of the eye-screws 14. Also the clamp 34 is properly secured to the running board. Now if it is desired to use the device for supporting the luggage upon the running board then the lazy tong structure is raised to its vertical position as shown in Figure 1, and the links 24 are brought into alignment and so locked for holding the lazy tong structure in this position. The lazy tong structure now serves as a fence for holding the luggage upon the running board and as is apparent the fence forms a safe means for retaining the luggage against accidental loss. If desired suitable straps may be used for securing the luggage in position and said straps being preferably extended through the slot 45 in the lugs 44, and also through the slots 46 in the clamp members 13 if necessary.

When the fence or lazy tong structure is in its vertical position, as shown in Figure 1, it will of course interfere with the opening of the doors of the automobile body, and as long as the luggage is retained upon the running board of course this cannot be overcome. However upon removing the luggage from the carrier the links 24 may then be folded, and with the same movement the sleeves 22 may be folded inwardly and thus bring the fence or lazy tong structure 30 to lie flat upon the running board of the automobile. The tongs of the automobile body may now be opened without the luggage carrier interfering therewith. As is seen the luggage carrier may be made a permanent fixture of an automobile and made use of whenever so desired. When it is desired to remove the luggage carrier entirely it is of course only necessary to remove the eye-screws 14 and 47 so that the pair of clamps 13 and intermediate clamp 34 may be removed from the running board. After the clamps have been removed the baggage carrier may be folded into a compact unit for storage.

While we have shown and described the preferred form of our invention, we wish it to be understood that we are aware of the fact that changes may be made in the combination and arrangement of parts by those skilled in the art without departing from the spirit of our invention.

We claim:—

1. A detachable supporting means of the character described, comprising a clamp substantially U-shaped and made of angle iron, the horizontal portions of which form the opposing faces of the clamp, a supporting member hinged to the vertical portion of one leg adjacent the bridge portion of the clamp, and foldable means extending between said supporting member and the vertical portion of the associated leg of said clamp whereby to hold the supporting member in a vertical position and also to permit the supporting member to be folded upon the horizontal portion of the associated leg or clamp.

2. In a device of the character described, a substantially U-shaped clamping member made of angle iron and the horizontal portions thereof forming the clamping surfaces of said clamping member, a split sleeve having a tang extending from one end thereof, a pivot connection between said tang and one leg of the clamping member, said pivot connection occurring adjacent the bridge portion of the clamp and the vertical portion of said leg, and said split sleeve adapted to be folded upon the horizontal portion of the associated leg, and an extension member slidably held within said split sleeve for the purpose described.

FREDERIC WALTER JACKSON.
CHARLES EDWARD WILLSON.